Nov. 27, 1962     J. G. VIGIL     3,065,937
COLLAPSIBLE SPACECRAFT
Filed April 18, 1960     2 Sheets-Sheet 1
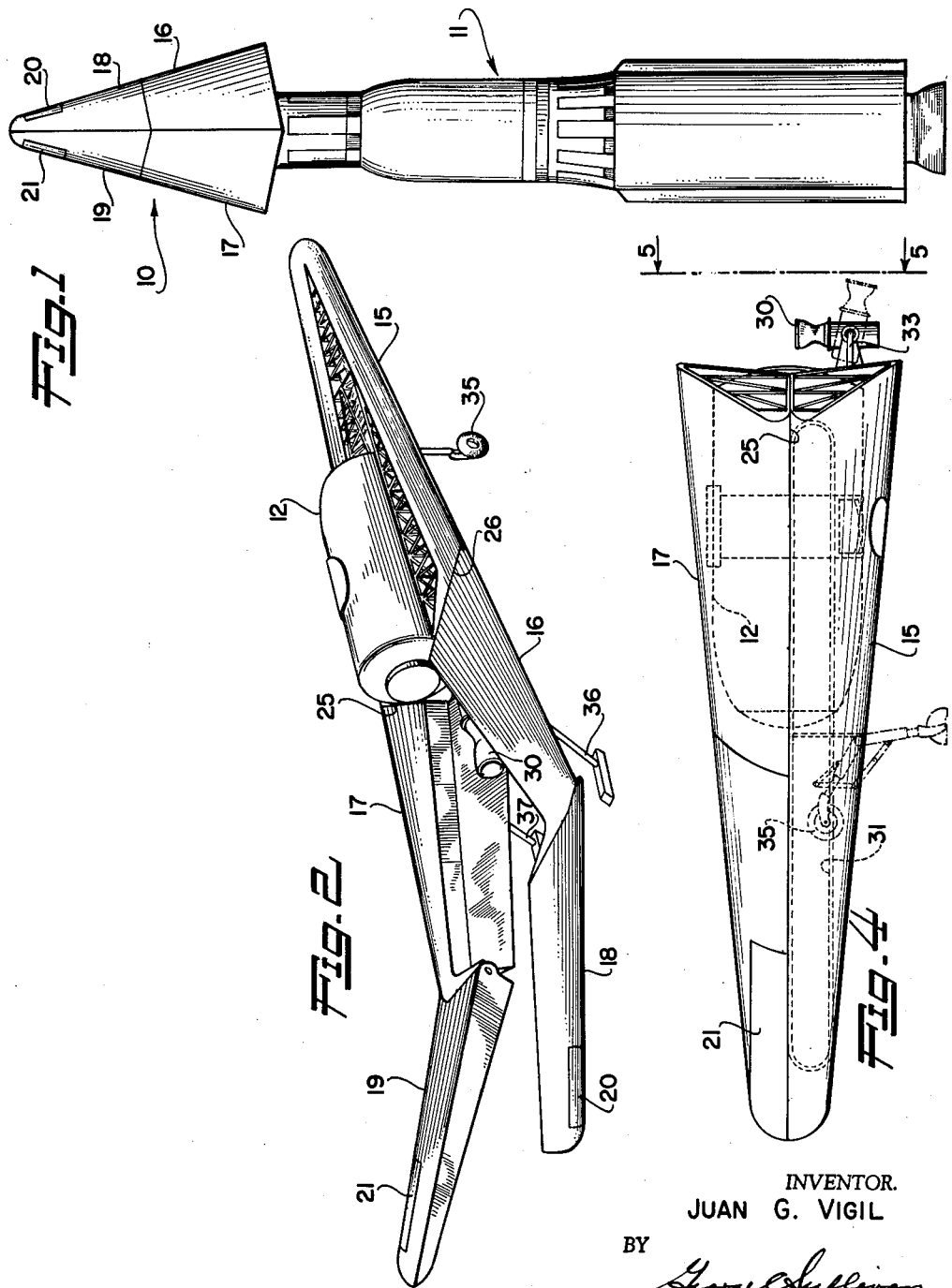
INVENTOR.
JUAN G. VIGIL
BY
George C. Sullivan
Agent

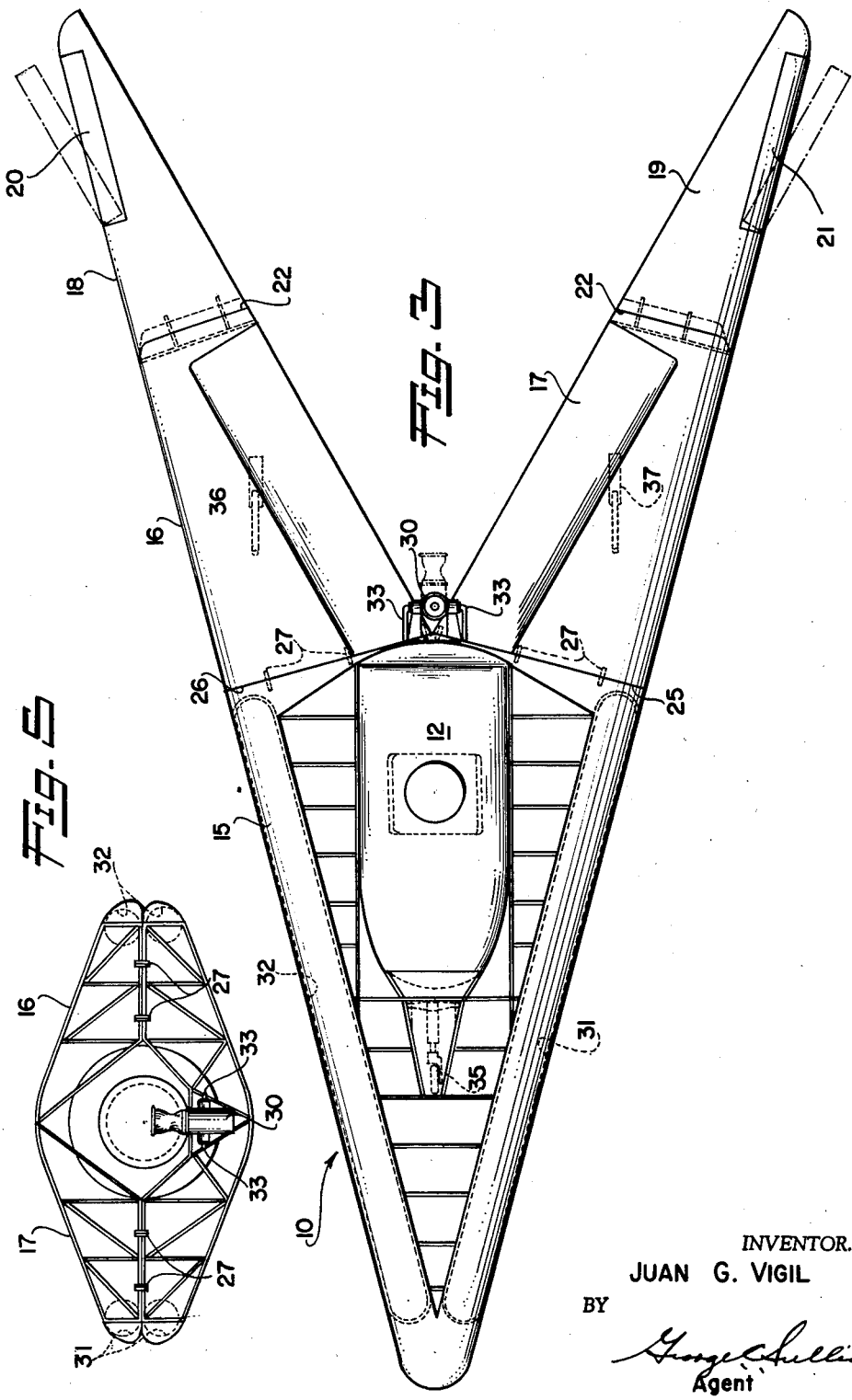

United States Patent Office 3,065,937
Patented Nov. 27, 1962

3,065,937
COLLAPSIBLE SPACECRAFT
Juan G. Vigil, Woodland Hills, Calif., assignor to Lockheed Aircraft Corporation, Burbank, Calif.
Filed Apr. 18, 1960, Ser. No. 22,770
10 Claims. (Cl. 244—46)

The present invention relates to a vehicle adapted for flight in an atmosphere and the space beyond.

In the art of space travel, it is desirable to provide a vehicle which can be thrust into space and brought through an atmosphere to a safe landing. Two major problems are encountered. The first is concerned with the launch phase. Means generating high thrust are generally necessary to propel the vehicle beyond the influence of gravity for launch. The great speeds developed upon launch require that aerodynamic forces upon the vehicle and its propulsion means must be substantially symmetrical in order to minimize control problems. That is, forces about the axis of movement must be balanced. If the vehicle is to carry personnel, it is usually required to be mounted on the exterior of the propulsion means where it will be subject to these aerodynamic forces. Thus the vehicle should preferably be symmetrical.

One solution has been to use a ridid body substantially cone shaped which adequately solves the launch problem. However re-entry into the atmosphere tends to be haphazard since because of great speed above the atmosphere, the re-entry path is a long free fall trajectory with point of landing indeterminate. The great speed causes frictional heating problems which cannot be controlled because the rate of approach to the planet of intended landing is uncontrolled. Parachutes or other drag devices are used to slow speed at touch down but are ineffective in the thinner areas of the atmosphere where the heating problem is at its extreme.

Thus, the second major problem is that of providing a vehicle which may be controlled within the atmosphere but which must be designed within the limits imposed by the launch phase. Control in the atmosphere contemplates airfoil means which will support the vehicle and embody control means by which the rate of approach to the earth's surface may be regulated and point of landing selected. These design limits are further complicated by the desirability of providing a compact relatively lightweight launch package which will provide protection for its contents, human or otherwise.

It is an object of the present invention to provide a vehicle which provides a compact package for launching into space and aerodynamic support means for flight within the atmosphere. Aerodynamic support means are folded to reduce size for launch and unfolded for flight.

It is another object of this invention to provide a space vehicle having an aerodynamically symmetrical launch configuration and a non-symmetrical flight configuration. Airfoils are folded against a fore body to present a pyramidal shape for stability about the longitudinal axis of the vehicle during launch. During re-entry and landing, the airfoils are extended creating an unsymmetrical lift means for flight and landing.

It is another object to provide a space vehicle having aerodynamic support surfaces of low weight loading so as to provide a long glide range within the atmosphere. A main forewing body is provided with airfoil characteristics. Wings which extend the airfoil from the forewing body provide a relatively large aerodynamic support resulting in a low load factor.

It is another object of the invention to provide a space vehicle possessing good heat radiation qualities in order to dissipate heat developed in the fringes of the atmosphere. The large area of the aerodynamic surfaces provides for large radiation area.

It is another object of the invention to provide a compact foldable space vehicle of such a configuration to provide room and protection for cargo or personnel. A delta-shaped fore wing body provides adequate room in the base part of the delta for a capsule.

It is another object of the invention to provide a vehicle having a wing of high bending and torsional stiffness. A high wing thickness to chord ratio makes this possible.

The manner in which the invention may be carried into effect is hereafter more fully described with reference to the accompanying figures wherein like numerals indicate like elements.

FIGURE 1 is a view of the vehicle with the wings folded into a compact symmetrical package and mounted atop a launch rocket.

FIGURE 2 is a perspective view of the vehicle with the wings and landing gear extended for landing.

FIGURE 3 is a plan view with the wings extended.

FIGURE 4 is a side view with the wings folded.

FIGURE 5 is a view taken on lines 5—5 of FIGURE 4 showing the symmetrical cross-section.

The vehicle 10 has the shape of a Grecian arrow in its flight configuration as in FIGURE 3. For launch the main wings of the vehicle 10 are folded against the fore wing body to form a slender pyramid having a symmetrical diamond shape cross-section. This shape has the advantage of presenting a small frontal area for minimum drag and symmetrically balanced aerodynamic forces about the longitudinal or fore and aft axis of vehicle 10 during the launch phase abroad rocket 11 as seen in FIGURE 1. Maneuvering and control in space is provided by a rocket motor 30 and other small reaction jets (not shown) located at critical positions at the periphery of the vehicle for maximum moment for pitch, yaw, roll and translation forces. The extended main wings, as shown in FIGURE 3, provide aerodynamic lift in the atmosphere. The wings are provided with movable elevon surfaces and drag rudders for aerodynamic control. Landing gear comprised of nose wheel and tail skids are extended for landing as shown in FIGURE 2. A capsule 12 is nested in the fore wing body 15 to house personnel, cargo and controls.

The flight configuration is shown in FIGURE 3. The forewing body 15 is delta-shaped and with main wings 16 and 17 extending aft from its base there is presented a Grecian arrow-shape. The ends of main wings 16 and 17 are pivoted at hinge line 22 to provide elevon control surfaces 18 and 19. Yaw control is provided by differential extension of drag rudders 20 and 21. Drag rudders 20 and 21 may be extended simultaneously to increase the over-all drag of the vehicle 10 as required.

The base of fore wing body 15 is broken to provide pivot axes 25 and 26, each of which is normal to the adjacent or intersecting leading edge of the body 15. Thus, when wings 16 and 17 are extended, as in FIGURE 3, the leading edge of each main wing 16 and 17 is aligned with its adjacent leading edge of the fore wing body 15. When folded, as in FIGURE 4, the leading edges will lie parallel to each other. Cross-sectional symmetry is provided by constructing main wings 16 and 17 of a depth equal at any point to the depth of the adjacent fore wing body 15 in the folded configuration. The high wing thickness to chord ratio inherently provides high bending and torsional stiffness. When extended, the forward edge of the under surfaces of the main wings meets the aft edge of the under surfaces of fore wing body 15. A section taken at any point along the longitudinal axis of the folded vehicle will be symmetrical. A plane intersecting the longitudinal axis of the folded vehicle 10 will present an isosceles triangle.

The upper and rear surfaces of wings 16 and 17 are relieved to provide a clearance for capsule 12 when the wings are folded against the body 15. The plan view of the vehicle in launch configuration is seen in FIGURE 1. The relationship of the wings, the elevons and the drag rudders are shown relative to the obscured fore wing body 15. Thus, the end of each wing 16 and 17 will lie adjacent to each other and against the nose of the fore wing body 15 in the launch configuration.

A small rocket motor 30 is provided at the base of the body 15 for directional control in space and for additional thrust during the landing phase, if such is necessary. During other phases of flight within the atmosphere the vehicle will function as a glider requiring no power. Propellant for the rocket motor 30 is housed in tanks 31 and 32 extending the leading edges of body 15. Fuel is conducted from tanks 31 and 32 through conduits 33 to rocket motor 30. For landing, nose wheel 35 and skids 36 and 37 may be extended from their retracted position in the final phase of landing.

Heating is a serious problem to be faced during entry into the atmosphere from space. The rigid Grecian arrow configuration is ideal since it provides a sufficient clearance between the exposed surfaces of the vehicle and the capsule in which personnel or cargo is carried to aid in insulation. The forward end is subjected to the greater temperatures with generally decreasing temperatures toward the aft end of the vehicle. It will be noted that the delta shape of the fore wing body 15 provides optimum spacing from the areas of the vehicle subjected to the higher temperatures. By use of the folding wing a large area aerodynamic surface of relatively thin skin is possible which is advantageous because of the heat radiation qualities. When the material of the skin reaches its heat saturation temperature, the rate of radiation increases. Thus, the heat problem is minimized.

The upper surfaces of body 15 are exposed to show the light truss construction possible in the Grecian arrow vehicle. In actual practice since high drag will not be especially objectionable, the upper surface will probably be exposed as shown as a means to save weight.

The vehicle 10 will approach the surface of the planet on which it is to land at a high angle of attack. Automatic control means may be provided to relieve the astronaut in control of the delicate problem of correlating rate of approach in relation to speed and temperature. Manual control will be available for the landing phase if necessary.

An important advantage of the present invention is controllability. A point of landing may be selected and the vehicle guided to it. Space vehicles which depend upon free fall or parachutes or other drag devices must rely upon accurate control of the point of entry into the atmosphere to achieve even close to an accurate landing point. The low wing loading made possible by extending the over-all aerodynamic support area provides a high glide ratio. The vehicle may glide well over 1500 miles from its point of entry into the atmosphere.

I have disclosed a space vehicle which provides for an optimum solution of factors including symmetry for launch, small frontal area for launch, strength, heating for re-entry, and control. Having disclosed these details and others I claim the following combinations and their equivalents as my invention.

I claim:

1. A vehicle comprising fore wing means of delta-shape, two main wings respectively extending from the base of the fore wing means and pivotally connected on a horizontal axis thereto and means to extend the main wings from a folded position lying parallel to and adjacent to the fore wing means to a position extending aft of the fore wing means.

2. A vehicle comprised of fore wing means having a delta shape, two main wing means each comprised of a shape and size substantially equal to one-half the fore wing means as divided by a vertical plane passing through the longitudinal axis, pivot means for each main wing at the base of the fore wing means to hinge the main wings to the fore wing means, means to extend each main wing from a position overlying the fore wing means to a position extending aft of the fore wing means, elevon means on the aft end of the main wings.

3. A vehicle comprised of a delta-shaped fore wing means having an acute angle apex with adjacent sides forming leading edges, pivot means on the base of the delta-shaped fore wing body on a line substantially perpendicular to each leading edge and lying substantially in the plane formed by the leading edges, main wings pivoted to the pivot means, the main wings having leading edges approximately equal in length to each leading edge of the fore wing means and means to move the wing means about the pivot means from a position lying adjacent the fore wings to a position extending aft.

4. A vehicle comprised of a delta-shaped fore body having an acute angled apex with adjacent sides forming leading edges, pivot means at the base of the delta-shaped fore body substantially at a right angle to each leading edge, wings pivoted to the pivot means each wing having elevon means pivoted thereto, drag rudder means pivoted to the elevon means, means to move the wings from a position overlying the delta-shaped fore body to an aft extended position wherein each leading edge of the fore body and that of its adjacent wing form a substantially continuous surface, the fore body and the wings when lying adjacent each other forming a body having a symmetrical cross section transverse to the longitudinal axis at any point along the longitudinal axis.

5. A vehicle comprised of a delta-shaped fore body having an acute angle apex with adjacent edges forming leading edges, pivot means at the base of the delta-shaped fore body substantially at a right angle to each leading edge, wings pivoted to the pivot means, elevon means pivoted to each wing, drag rudder means pivoted to the elevon means, means to move the wings from a position overlying the delta-shaped fore body to an aft extended position in which position each leading edge of the fore body and that of its adjacent wing form a substantially continuous surface, the fore body and the wings when lying adjacent each other forming a body having a symmetrical cross section transverse to the longitudinal axis at any point along the longitudinal axis, a control capsule in the delta-shaped fore body, the trailing edges of the wings being cut away to accommodate the capsule when overlying the main body.

6. A vehicle comprised of fore wing means having a delta shape, two main wing means each comprised of a shape and size substantially equal to one-half the fore wing means as divided by a vertical plane passing through the longitudinal axis, pivot means for each main wing at the base of the fore wing means to hinge the main wings to the fore wing means, means to extend each main wing from a position overlying the fore wing means to a position extending after of the fore wing means, elevon means on the aft end of the main wings, and drag rudder means pivoted to the elevon means.

7. A vehicle comprised of fore wing means having a delta shaped, two main wing means each comprised of a shape and size substantially equal to one-half the fore wing means as divided by a vertical plane passing through the longitudinal axis, pivot means for each main wing at the base of the fore wing means to hinge the main wings to the fore wing means, means to extend each main wing from a position overlying the fore wing means to a position extending aft of the fore wing means, elevon means on the aft end of the main wings, drag rudder means pivoted to the elevon means on a vertical axis.

8. A vehicle comprised of fore wing means having a delta shape, two main wing means each comprised of a shape and size substantially equal to one-half the fore wing means as divided by a vertical plane passing through the longitudinal axis, pivot means for each main wing at the base of the fore wing means to hinge the main wings to the fore wing means, means to extend each main wing from a position overlying the fore wing means to a position extending aft of the fore wing means, elevon means pivoted to the aft end of the main wings on a horizontal axis.

9. A vehicle comprised of fore wing means having a delta shape, two main wing means each comprised of a shape and size substantially equal to one-half the fore wing means as divided by a vertical plane passing through the longitudinal axis, pivot means for each main wing at the base of the fore wing means to hinge the main wings to the fore wing means, means to extend each main wing from a position overlying the fore wing means to a position extending aft of the fore wing means, elevon means pivoted to the aft end of the main wings on a horizontal axis, drag rudder means pivoted to the elevon means on a vertical axis.

10. A vehicle comprised of fore wing means having a delta shape, two main wing means each comprised of a shape and size substantially equal to one-half the fore wing means as divided by a vertical plane passing through the longitudinal axis, pivot means for each main wing at the base of the fore wing means to hinge the main wings to the fore wing means, means to extend each main wing from a position overlying the fore wing means to a position extending aft of the fore wing means, elevon means pivoted to the aft end of the main wings on a horizontal axis, the trailing edges of the wings being cut away to accommodate the capsule when overlying the main body.

References Cited in the file of this patent
UNITED STATES PATENTS

| | | |
|---|---|---|
| 2,684,213 | Robert | July 20, 1954 |
| 2,915,261 | Wallis | Dec. 1, 1959 |